US008723927B2

(12) United States Patent
Rosen

(10) Patent No.: US 8,723,927 B2
(45) Date of Patent: May 13, 2014

(54) SUBTITLING STEREOGRAPHIC IMAGERY

(76) Inventor: Daniel Rosen, Westlake Village, CA (US)

(*) Notice: Subject to any disclaimer, the term of this patent is extended or adjusted under 35 U.S.C. 154(b) by 1295 days.

(21) Appl. No.: 12/415,049

(22) Filed: Mar. 31, 2009

(65) Prior Publication Data

US 2010/0245666 A1   Sep. 30, 2010

(51) Int. Cl.
*H04N 13/04* (2006.01)
*H04N 7/00* (2011.01)

(52) U.S. Cl.
USPC ............................................. 348/51; 348/473

(58) Field of Classification Search
USPC ................................................. 348/51, 473
See application file for complete search history.

(56) References Cited

U.S. PATENT DOCUMENTS

| 2,122,649 | A |   | 7/1938  | Kahn |
| 2,189,285 | A |   | 2/1940  | Gruber |
| 2,511,334 | A |   | 6/1950  | Gruber |
| 2,516,718 | A |   | 7/1950  | Oriol |
| 2,680,400 | A |   | 6/1954  | Smith |
| 3,255,977 | A |   | 6/1966  | Halco |
| 3,645,733 | A |   | 2/1972  | Brinckman et al. |
| 4,666,271 | A |   | 5/1987  | Gonsot |
| 5,367,348 | A | * | 11/1994 | Nachmanson et al. ......... 352/90 |
| 6,741,323 | B2 |  | 5/2004  | Plunkett |
| 8,089,507 | B2 | * | 1/2012 | Ikeda et al. ..................... 348/43 |
| 2009/0066785 | A1 | * | 3/2009 | Lee ................................ 348/51 |
| 2010/0021141 | A1 | * | 1/2010 | Yamashita et al. ............ 386/109 |

OTHER PUBLICATIONS

Unknown, "Stereoscopic Subtitle Guide", http://www.3dtv.at/knowhow/subtitles_en.aspx, Accessed on Sep. 28, 2009, pp. 1-3.
Unknown, "Adding stereoscopic subtitles to your movies by the help of ffdshow !", http://www.gali-3d.com/archive/articles/ffdshow-manual/ffdshow_stereo_subtitles.php, Accessed on Sep. 28, 2009, pp. 1-5.

* cited by examiner

*Primary Examiner* — Joon H Hwang
*Assistant Examiner* — Suraj Joshi
(74) *Attorney, Agent, or Firm* — SoCal IP Law Group LLP

(57) ABSTRACT

There is disclosed a method and apparatus for subtitling stereoscopic imagery. The stereoscopic imagery may include a plurality of paired stereo images having a perspective and providing a stereoscopic scene, wherein each image of a given pair represents a perspective of the imagery as viewed by a single eye of the stereoscopic scene. A subtitle may be presented solely upon one image of the stereo pair of images of at least some of the stereoscopic imagery.

3 Claims, 16 Drawing Sheets

US 8,723,927 B2

SUBTITLING STEREOGRAPHIC IMAGERY

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to the placement of subtitles on stereoscopic imagery.

2. Description of the Related Art

It is well known that stereoscopic motion and still imagery may be obtained by the capture of what is called the stereoscopic image pair. The stereoscopic image pair is constituted by two images of an object or scene, taken from different points of view such that each of the two points of view (or eyes) of the pair creates an image from the perspective of the what would be seen by the right or left eye respectively of a person viewing the scene from that particular point of capture. When the stereoscopic image pair is viewed using a system that presents each of the two images of the image pair to the viewer in such a way that each of the viewer's eyes sees only that image corresponding to the respective eye; left to left, right to right; the illusion of three-dimensional depth is created. Such systems have been described in U.S. Pat. No. 542,321, U.S. Pat. No. 2,122,649, U.S. Pat. No. 2,309,879, U.S. Pat. No. 2,463,311, U.S. Pat. No. 2,511,334 and U.S. Pat. No. 2,570,654.

Common practice for the subtitling of stereoscopic motion and still imagery has been to imprint subtitles upon both the left and right images of the stereo image pairs or to imprint subtitles on areas completely exterior to the image frame, such as separate title cards or areas of the medium upon which the image pairs are printed which are separate and distinct from the areas within which the actual images themselves are printed.

When imprinting subtitles within the image area of both eye views of a stereo pair of stereoscopic motion or still imagery prior to exhibition, or when separately projecting the subtitles onto the left and right eye views at exhibition time, much care must be taken in the placement of these subtitles in order to prevent misalignment of the two projected views of the subtitle. Such misalignment has been shown to cause discomfort to the viewer if there is even a slight placement error between the left and right eye subtitles. In addition the placement of these stereo subtitles must be done in such a fashion as to not create occlusions or interference with the main imagery which would obscure such portions of the imagery as are necessary to provide depth cues to the viewer and in so doing, eliminate the illusion of three-dimensional depth.

It is well known that text graphic characters and elements may be imprinted directly on film utilizing systems and methods such as those described in U.S. Pat. No. 5,367,348 or may be separately projected from a film print or digital file containing only subtitles in synchronicity with the motion picture images and sound track utilizing systems and methods such as those described in U.S. Pat. No. 6,741,323 B, U.S. Pat. No. 6,046,778, and U.S. Pat. No. 4,673,266. Text, graphic characters and elements may also be composited onto digital files utilizing computer software. These digital files may then be printed onto paper, film stock or other medium, or they may be assembled into sequences of one or more stereo pairs and viewed utilizing a digital system containing one or more projectors or displays.

Subtitles may be stored as part of a digital motion imagery file which is stored on a suitable device and in such a suitable format that said digital file may be projected utilizing digital projection devices or may be viewed utilizing video devices. Such a digital file may correspond to a Digital Cinema Initiative Distribution Package (DCP) as taught by Digital Cinema Initiatives, LLC's "Digital Cinema System Specification".

Figure 1:
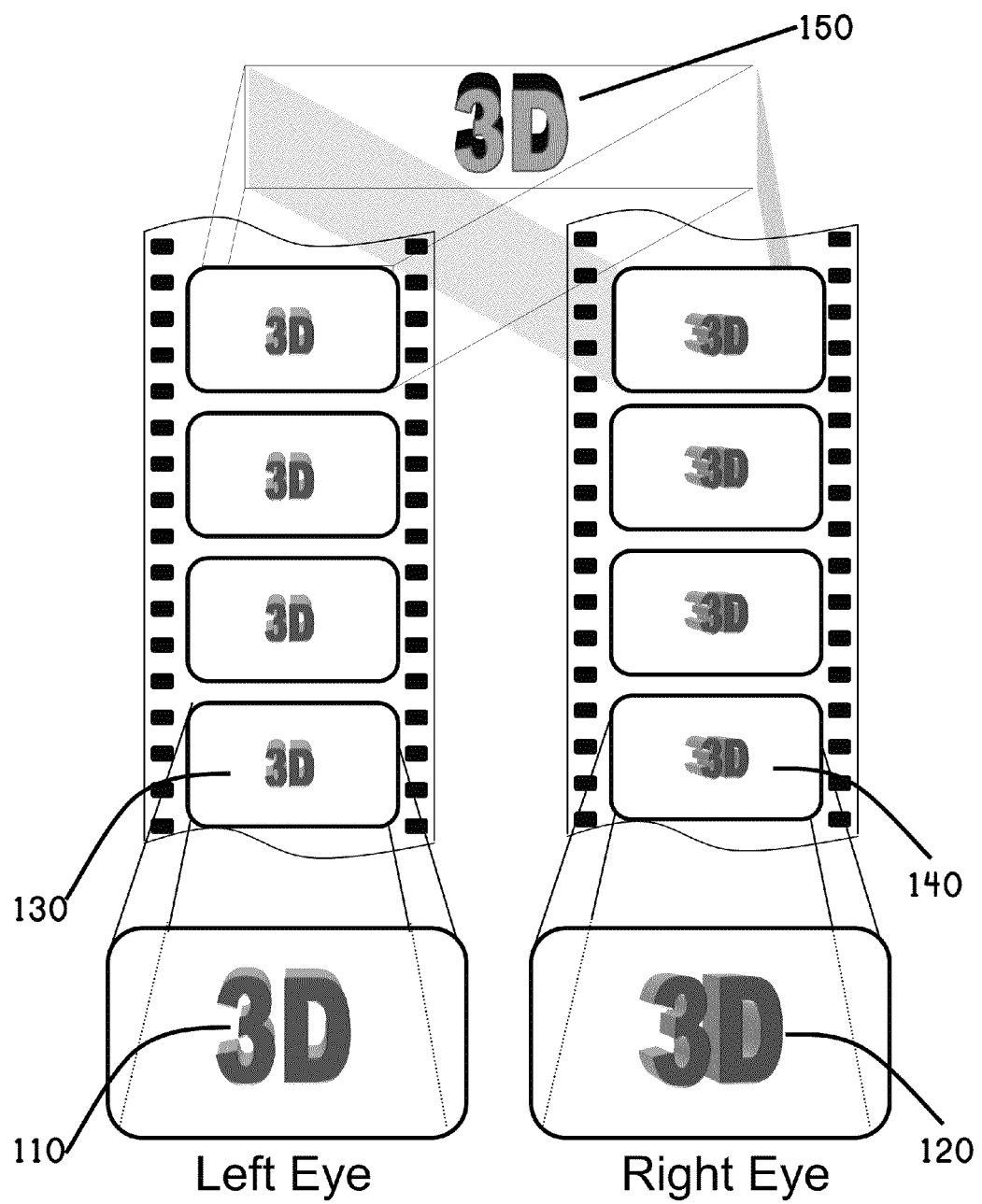
FIG. 1 is a diagram of two pieces of film, each of which has a sequence of images that reproduce the view of a single scene from the perspective of the left or right eye view as would naturally occur in binocular vision.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

As used herein, the term "subtitling" means the addition of visual text, graphic characters or elements to imagery, in order to provide explanatory or additional information such as language translation, action cues, camera data, or scene information to the viewer of the imagery. This disclosure makes no distinctions between the terms titling, subtitling or metadata display. This method is applicable to any and all visual text, graphic characters or elements added to imagery; and which visual text, graphic characters or elements do not exist in the captured imagery nor in any computer generated portions of the imagery that comprise an elemental component of the photographic or cinematographic art of that imagery, regardless of the information content or end use of the visual text, graphic characters or elements.

The present method provides the technique of subtitling stereoscopic (3D) motion and still pictures by placement of the visible subtitle upon that single image of a stereo pair of images which represents the view of the captured subject from the perspective of the single eye associated with the selected image in the pair The method herein described, eliminates the possibility of subtitle misalignment or interference of the three-dimensional depth illusion by providing that only the images that represent the view from a single eye shall be imprinted with subtitles. Such a method may be utilized with stereoscopic motion and still pictures which are printed on film stock and projected utilizing standard film projectors as well as stereoscopic motion and still pictures which are stored in digital files and projected utilizing digital projectors or digital display systems. Such a method may also be utilized with stereoscopic still images that are printed on film stock or paper or another medium and the individual frames mounted in such a manner as to allow a viewer, with a proper device, the ability to view a single stereo pair of images with the illusion of depth.

Within this method, either the right or left eye image sequence may be selected for subtitling. The choice of eye is not critical to the realization of this method. The method simply specifies that only one of the eye views shall be subtitled, not both. The method recommends that within a given, complete sequence of stereo pairs which constitute a complete work, the choice of which eye view is imprinted with the subtitles should remain fixed and not alternate. From one complete work comprised of one or more stereo pairs of images to the next, the choice of which eye view is imprinted with the subtitles may be changed. The alternation of the eye view choice within a single work is anticipated by this disclosure, although it is common knowledge that the motion of fixed objects, such as subtitles, within a sequence of images is unduly distracting and should be highly discouraged.

Subtitling may be composited into the digital images corresponding to a single eye view of each stereo pair at the time of original digital mastering.

Subtitling may be stored in an appropriate, separate digital file from the stereo pairs of imagery, such as the DCP Subtitle Track File, as subpictures or timed text elements for those digital images corresponding to a single eye view of the two required eye views. The digital files that represent the second eye view from the stereo image pairs contain no imagery data. That is, they present a clear image when projected. This separate digital file is intended to be projected in synchronicity with the main digital image pair files.

Subtitling may be applied by a suitable mechanism within the stereoscopic camera that places the textual information into one of the two images of each captured stereo pair.

With reference to FIG. 1, a sequence of images may be printed upon two lengths of film. Each length of film contains the sequential images which were captured or rendered by a computer program and represent the scene from the perspective of one eye of the stereo image pair. 110 is the image as is seen by the left eye and 120 is the image as is seen by the right eye. 130 shows the length of film on which are printed the images captured by a camera or rendered by a computer program from the perspective of the left eye. 140 is the length of film on which are printed the images captured by a camera or rendered by a computer program from the perspective of the right eye. The combination of the images of the stereo pair create an illusion of three-dimensional depth 150.

Figure 2:
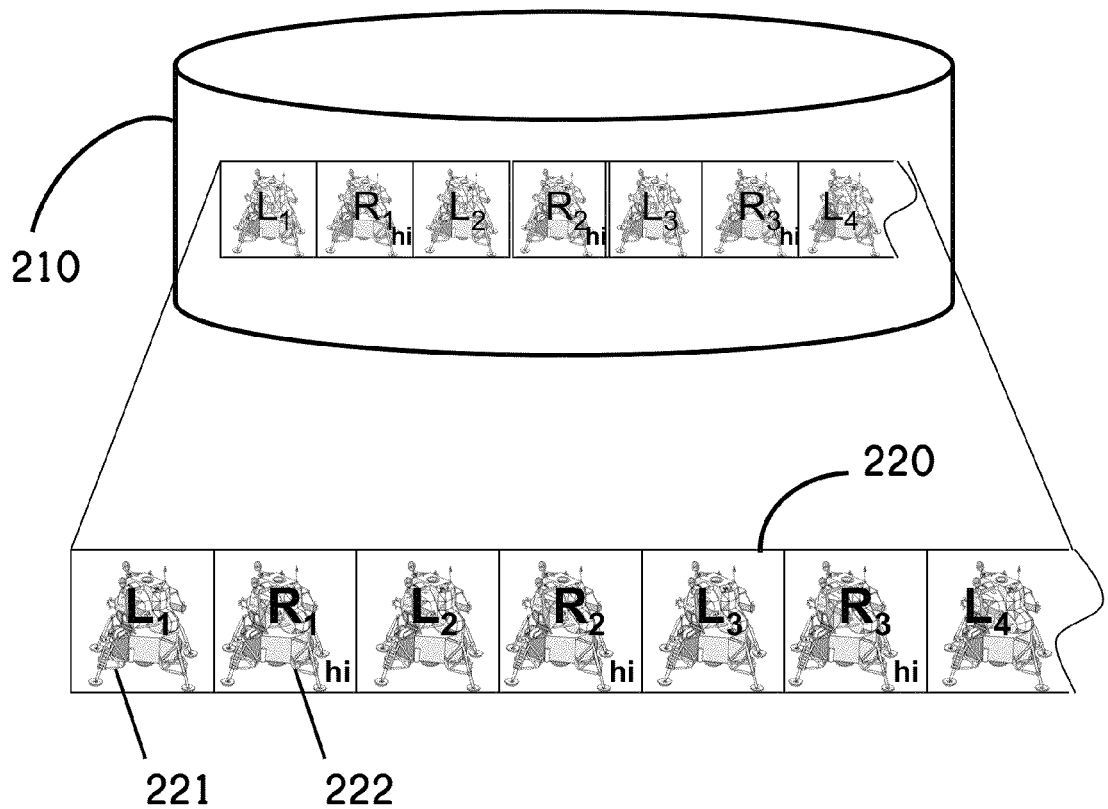
FIG. 2 is a schematic view of a digital cinema distribution package (DCP) containing a stereoscopic motion picture sequence with interleaved left and right eye views stored as alternating image files in the DCP Track File. Subtitle text is rendered by a computer program onto the right eye view frames only of the Track File.

With reference to FIG. 2, a motion picture is stored in a digital format and on a digital media 210 which may correspond to the Track File 220 of a Digital Cinema Initiative Distribution Package (DCP) as taught by Digital Cinema Initiatives, LLC's "Digital Cinema System Specification". The stereo pairs are stored as an interleaved sequence of left 221 and right 222 images. The frames are labeled $L_n$ for the nth frame of the left eye sequence and $R_n$ for the nth frame of the right eye sequence, with the value of n ranging sequentially from 1 to whatever value is needed to enumerate all the stereo pairs in the sequence. The subtitle text is rendered by a computer program onto the digital files which contain the images representing a single eye view from the stereo image pairs. The subtitles are shown as having been rendered onto the right eye views, for representative purposes.

Figure 3:
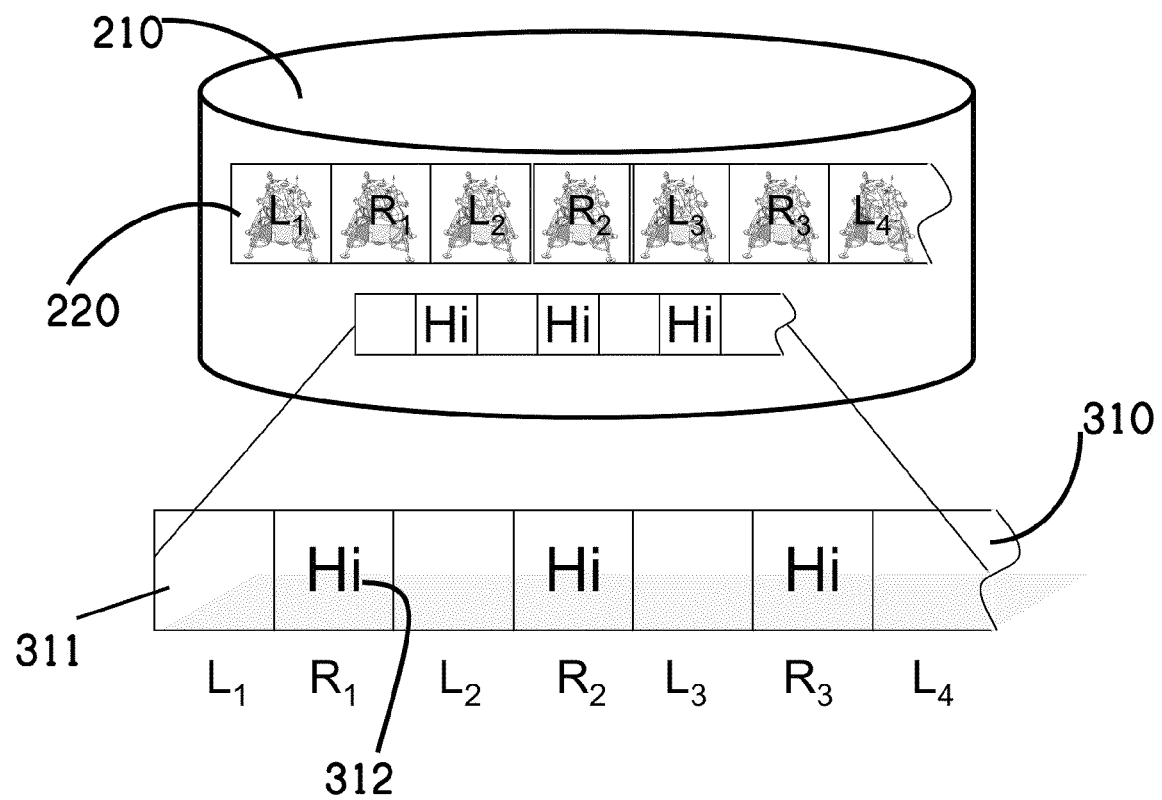
FIG. 3 is a schematic view of a digital cinema distribution package (DCP) Subtitle Track File for a stereoscopic motion picture sequence with subtitle text rendered by a computer program onto the right eye frames only of the Subtitle Track File.

With reference to FIG. 3, a motion picture is stored in a digital format and on a digital media 210 which may correspond to the Subtitling File 310 of a Digital Cinema Initiative Distribution Package (DCP) as taught by Digital Cinema Initiatives, LLC's "Digital Cinema System Specification". The subtitles are stored as an interleaved sequence of left 311 and right 312 images. The subtitle text is rendered by a computer program onto the digital files which contain the images representing a single eye view from the stereo image pairs. The frames containing the subtitling information contain no other data. The digital files that represent the second eye view from the stereo image pairs contain no imagery data. That is, they present a clear image when projected or they contain text data that consists solely of a blank character.

Figure 4:
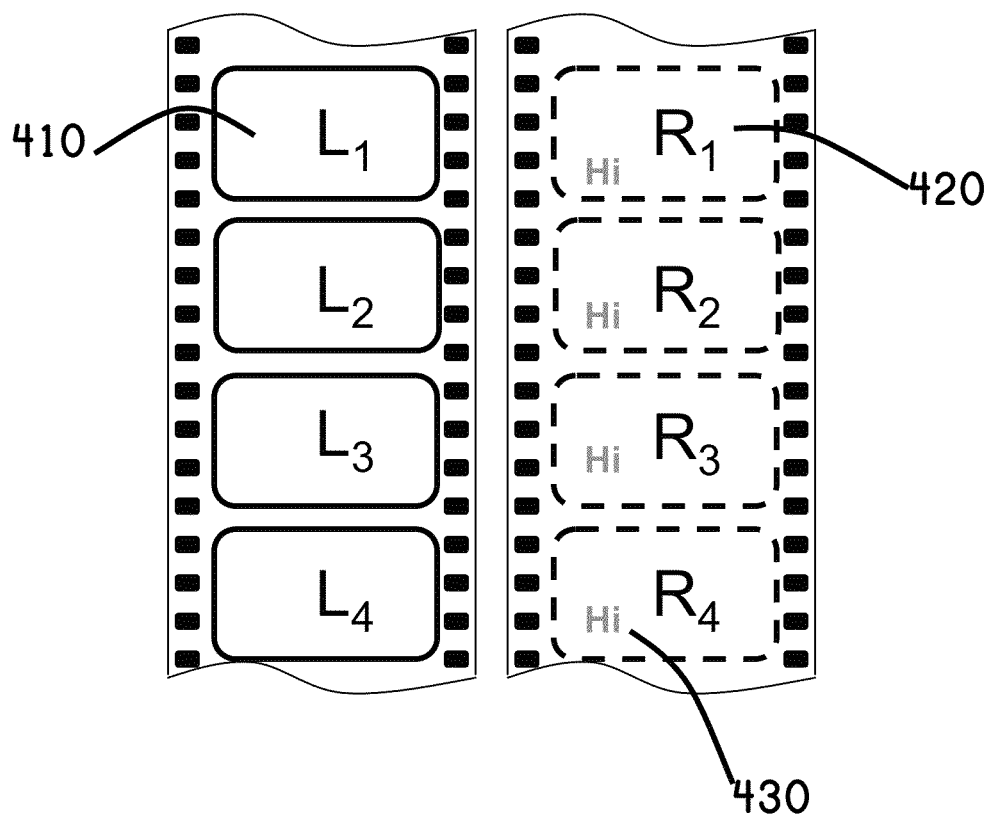
FIG. 4 is a diagram of two pieces of film, each of which reproduces a single eye perspective of a stereoscopic scene, with only the right eye view image sequence having subtitle text imprinted thereon.

With reference to FIG. 4, the stereoscopic motion imagery is printed on two lengths of film, one length corresponding to the left eye view 410, and one length corresponding to the right eye view 420. The subtitle text 430 is imprinted upon the film length corresponding to a single eye's view from the stereo pair. Such imprinting may be done utilizing laser or other high energy engraving such as is described in U.S. Pat. No. 6,277,458, U.S. Pat. No. 5,367,348. Such imprinting may be done utilizing a chemical method of recording onto the film emulsion such as is described in U.S. Pat. No. 3,645,733, U.S. Pat. No. 2,915,581.

Figure 5:
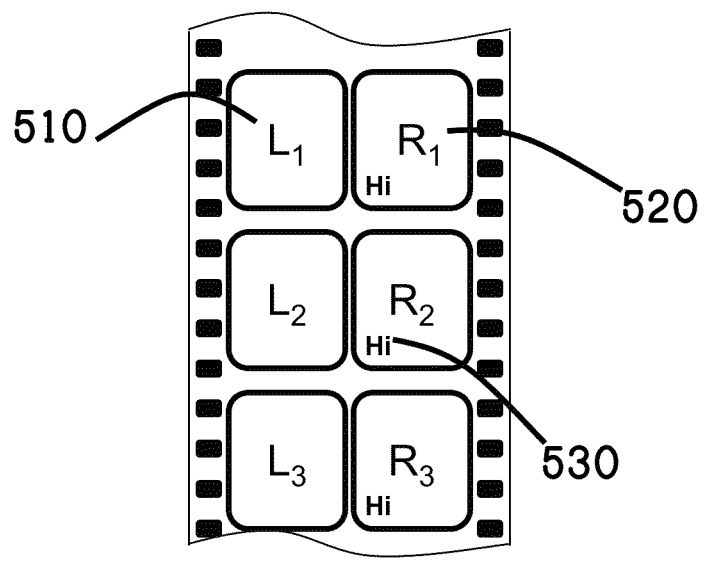
FIG. 5 is a diagram of a single piece of film with a sequence of stereo image pairs printed side by side on said piece of film, with only the right eye view image sequence having subtitle text imprinted thereon.

With reference to FIG. 5, the stereoscopic motion imagery is printed on a single length of film. Each area of the film that is projected at a given time, contains two images side by side horizontally; one image corresponding to the left eye view 510, and one image corresponding to the right eye view 520. The subtitle text 530 is imprinted upon the image corresponding to a single eye's view from the stereo pair.

Figure 6:
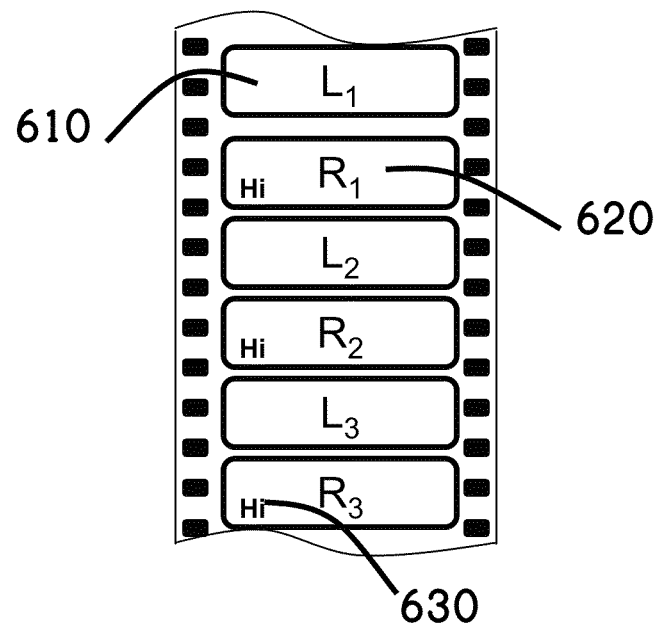
FIG. 6 is a diagram of a single piece of film with a sequence of stereo image pairs printed as alternating frames so as to interleave the left and right eye views on said piece of film, with only the right eye view image sequence frames having subtitle text imprinted thereon.

With reference to FIG. 6, the stereoscopic motion imagery is printed on a single length of film. Each area of the film that is projected at a given time, contains two images one above the other vertically; one image corresponding to the left eye view 610, and one image corresponding to the right eye view 620. The subtitle text 630 is imprinted upon the image corresponding to a single eye's view from the stereo pair.

Figure 7:
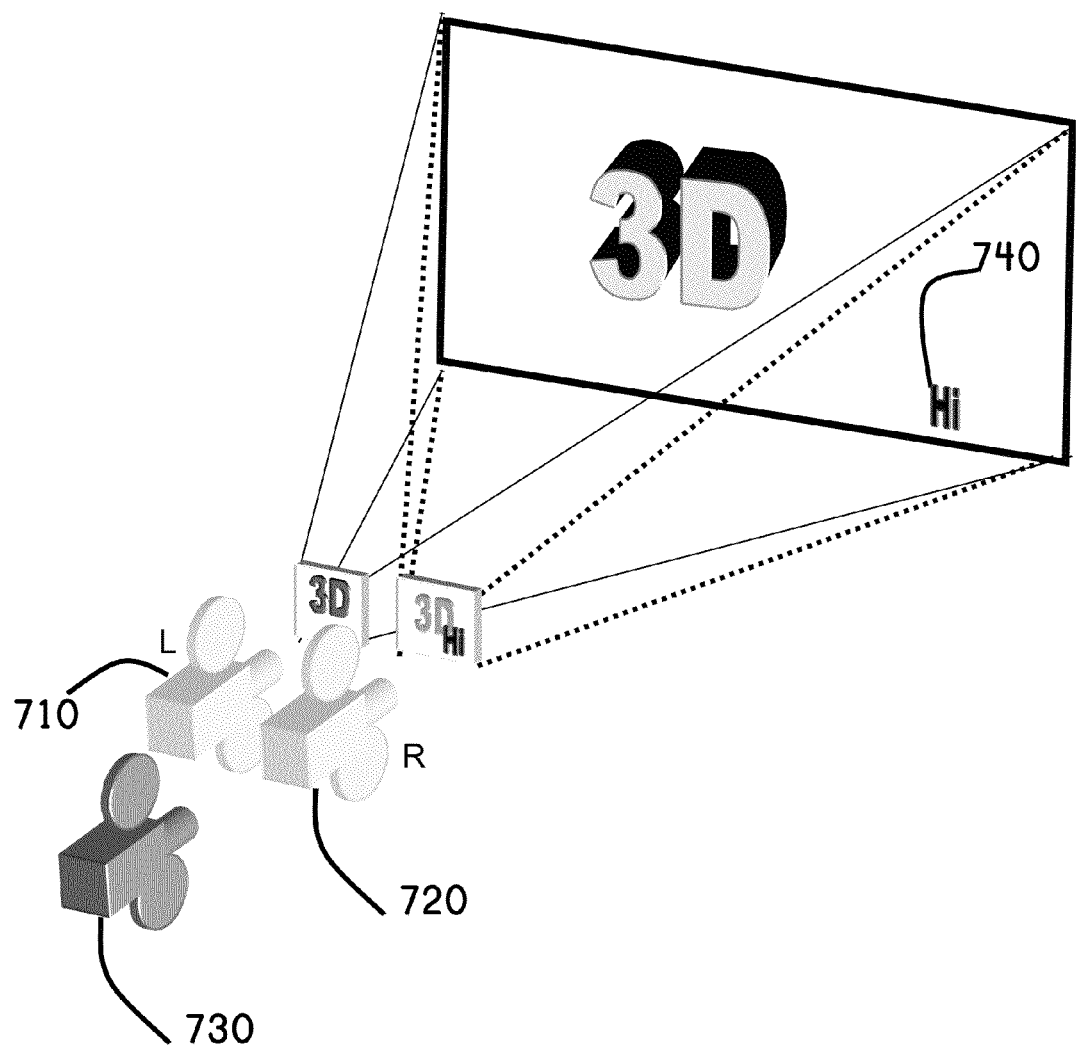
FIG. 7 is a block diagram of a system in which one projector, if single strip stereoscopic film is used, or two projectors, if two film prints are needed, show a stereoscopic motion picture with subtitles on the right eye view portion of the imagery. The projectors may correspond to digital projectors as well as film projectors.

With reference to FIG. 7, if the stereo pairs of imagery which comprise the motion picture have been recorded onto two separate lengths of film; one containing the sequence of left eye view images and a second length of film containing the corresponding right eye view images, the stereoscopic motion imagery may be projected using two projectors, one projecting the left eye view 710 and one projecting the right eye view 720. If the stereo pairs of imagery which comprise the motion picture have been recorded onto a single length of film, with both the right and left eye views recorded thereon (such as is shown in FIG. 5 and FIG. 6), the stereoscopic motion imagery may be projected using a single projector 730. If the stereographic imagery sequence has been digitally mastered with subtitles having been digitally composited onto a single eye view and the digital image sequence has been formatted as a Track File 220 of a Digital Cinema Initiative Distribution Package (DCP) as taught by Digital Cinema Initiatives, LLC's "Digital Cinema System Specification" or if the stereographic imagery sequence has been digitally mastered with subtitles having been formatted alone as a Subtitling File 310 of a Digital Cinema Initiative Distribution Package (DCP) as taught by Digital Cinema Initiatives, LLC's "Digital Cinema System Specification", then dual projectors 710 and 720 or the single projector 730 shown, will correspond to a digital projector which is compliant with the Digital Cinema Initiatives, LLC's "Digital Cinema System Specification".

Figure 8:
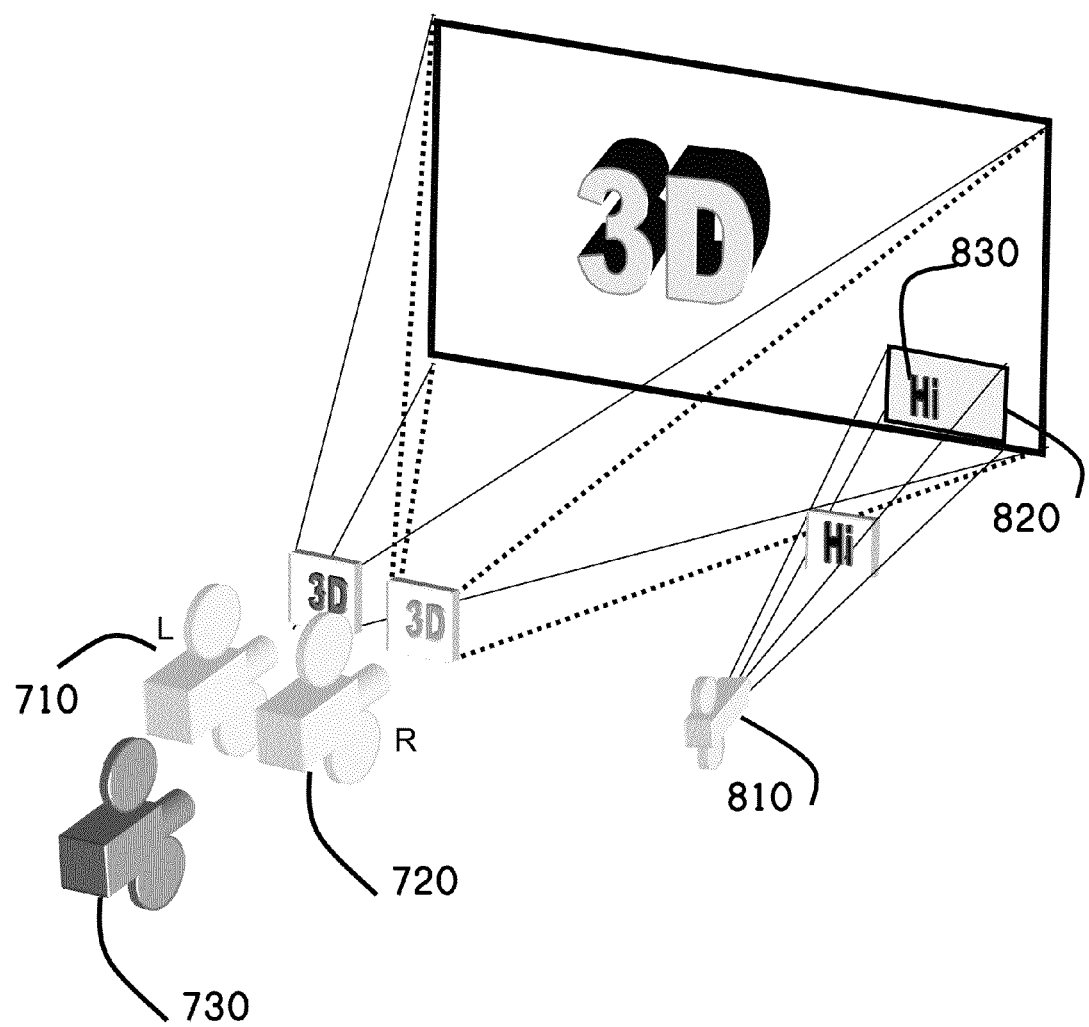
FIG. 8 is a block diagram of a system in which a dual projection system is utilized to superimpose subtitles on a motion picture. It illustrates an embodiment of this method wherein one projector, if single strip stereoscopic film is used, or two projectors, if two film prints are needed, show a stereoscopic motion picture and a single supplemental projector displays subtitles on the right eye view portion of the imagery. Any or all the projectors may correspond to digital projectors as well as film projectors.

With reference to FIG. 8, if the stereo pairs of imagery which comprise the motion picture have been recorded onto two separate lengths of film; one containing the sequence of left eye view images and a second length of film containing the corresponding right eye view images, the stereoscopic motion imagery may be projected using two projectors, one projecting the left eye view 710 and one projecting the right eye view 720. If the stereo pairs of imagery which comprise the motion picture have been recorded onto a single length of film, with both the right and left eye views recorded thereon (such as is shown in FIG. 5 and FIG. 6), the stereoscopic motion imagery may be projected using a single projector 730. In either of the two modes of projection, a supplemental projector method of subtitling may be used wherein the subtitle text 830 is projected synchronously from a single supplemental projector 810 onto an area 820 of a single eye view from the stereo pair as it is being displayed upon the viewing surface. Such synchronous subtitle projection may be done utilizing methods such as described in U.S. Pat. No. 6,741,323B2.

Figure 9:
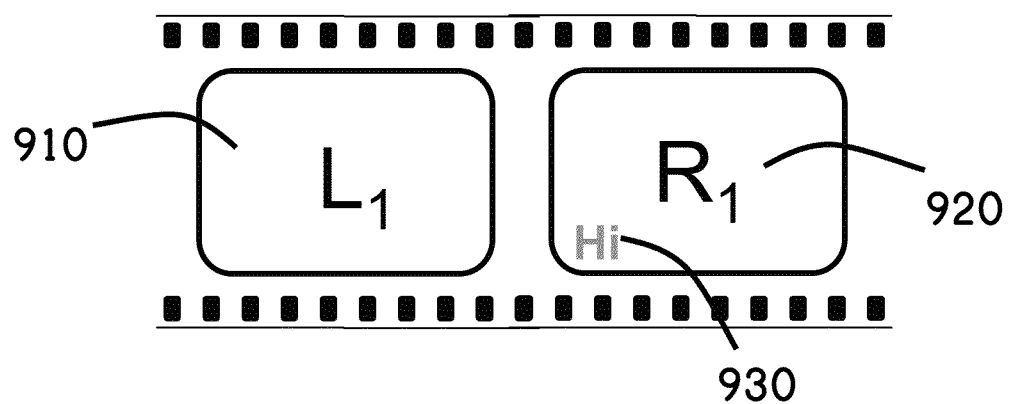
FIG. 9 is a schematic view of stereoscopic still imagery on film, with only the right eye view image sequence having subtitle text imprinted thereon.

With reference to FIG. 9, a stereoscopic still image pair is captured by a stereoscopic camera; one image 910 representing the left eye view and one image 920 representing the right eye view of the scene. The subtitle 930 is imprinted upon the image corresponding to a single eye's view from the stereo pair. Such imprinting may be done by an appropriate mechanism internally to the stereoscopic camera. Such imprinting may also be done externally to the stereoscopic camera, either upon the film negative, if it is deemed more efficient to do so to allow for multiple prints of material whose subtitling data does not change, or upon the final film print if it is deemed more efficient to do so given subtitling data which changes from print to print or print batch to print batch. Although FIG. 9 is drawn with the images shown as being captured on film, this is for illustration purposes only. The images may be captured utilizing a digital stereoscopic camera with the images stored in an appropriate digital format by the camera on appropriate digital media with the subtitle being digitally imprinted or composited onto the digital frame file that corresponds to a single eye's view from the stereo pair.

Figure 10:
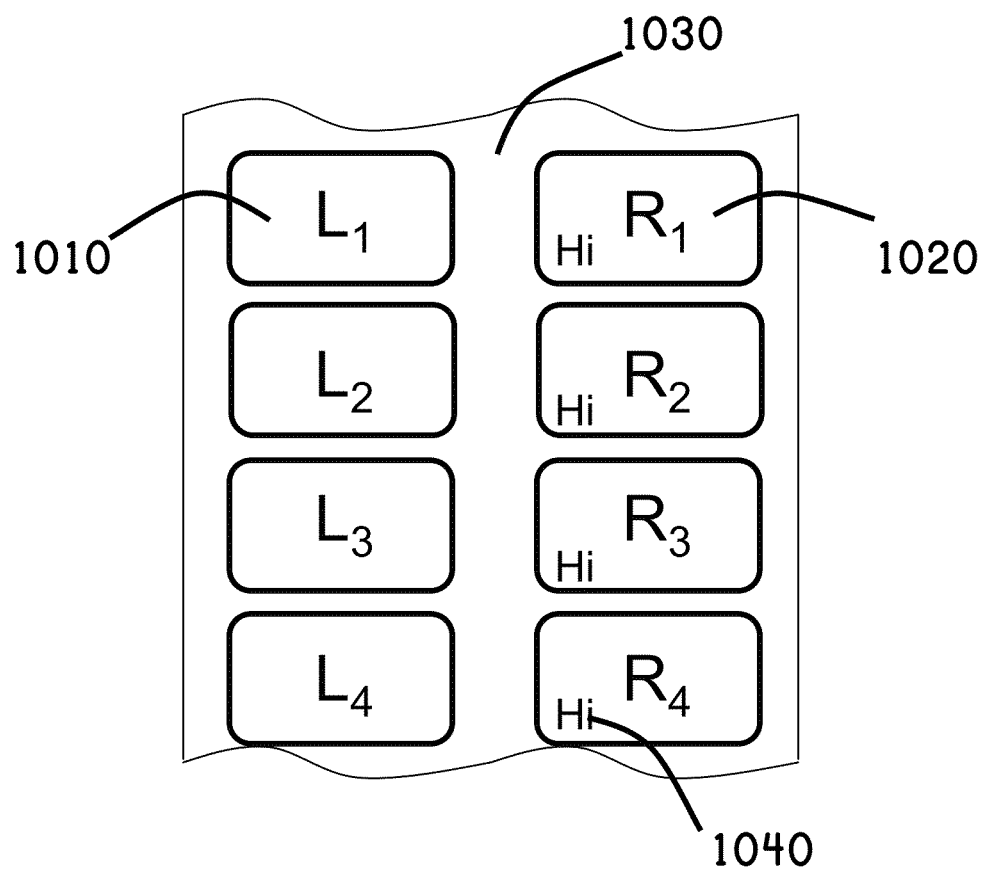
FIG. 10 is a schematic view of a type of stereoscopic still imagery media wherein the stereo pairs of images are mounted in a holder of cardboard, plastic or other suitable material and the holder may be transported manually or with a proper mechanism through a stereoscopic viewer. Only the right eye view image has subtitle text imprinted thereon.

With reference to FIG. 10, a set of stereo image pairs, each containing a left eye view 910 and a right eye view 1020, has been mounted into a holder 1030 of appropriate material and arranged in an appropriate fashion so that the holder may be moved manually or by a mechanism through a stereoscopic viewing device. As the viewer moves the holder from one stereo pair to the next, he is presented by a new stereoscopic image creating an illusion of three-dimensional depth. Subtitle text 1040 is imprinted upon the image corresponding to a single eye's view from the stereo pair. Such imprinting may be done utilizing standard printing methods, laser or other high energy engraving or chemical methods of recording. The pairs may have been previously mounted into the holder prior to subtitling or the stereo pairs may be mounted after they have been subtitled using the methods discussed above with reference to FIG. 9.

Figure 11:
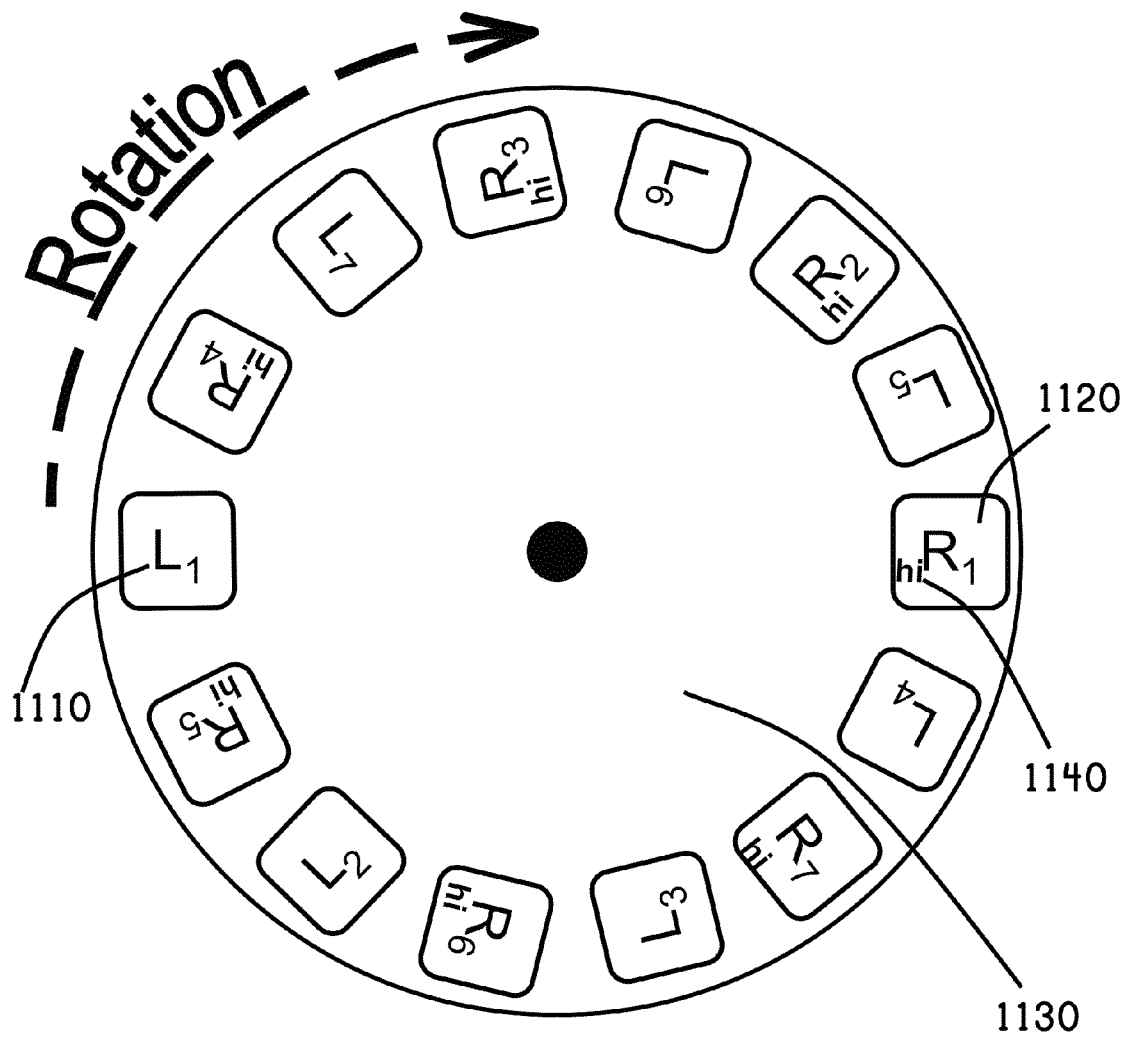
FIG. 11 is a schematic view of a type of stereoscopic still imagery media wherein the stereo pairs of images are mounted in a circular holder of cardboard, plastic or other suitable material and the holder may be transported manually or with a proper mechanism through a stereoscopic viewer. Only the right eye view image has subtitle text imprinted thereon.

With reference to FIG. 11, a set of stereo image pairs, each containing a left eye view 1110 and a right eye view 1120, has been mounted into a holder 1130 of appropriate material and arranged in a circular fashion so that the holder may be moved manually or by a mechanism through a stereoscopic viewing device. As the viewer moves the holder from one stereo pair to the next, he is presented by a new stereoscopic image creating an illusion of three-dimensional depth. Subtitle text 1140 is imprinted upon the image corresponding to a single eye's view from the stereo pair. Such imprinting may be done utilizing standard printing methods, laser or other high energy engraving or chemical methods of recording. The pairs may have been previously mounted into the holder prior to subtitling or the stereo pairs may be mounted after they have been subtitled using the methods discussed above with reference to FIG. 9.

It should be noted that with respect to stereoscopic still images mounted into holders such as discussed with reference to FIG. 9 and FIG. 10, the discussion of the imagery as being printed on film is not intended to be exclusive of the stereo pairs being printed on other printed media such as paper, nor are the geometries shown intended to be exclusive of the design of the image holders.

Figure 12:
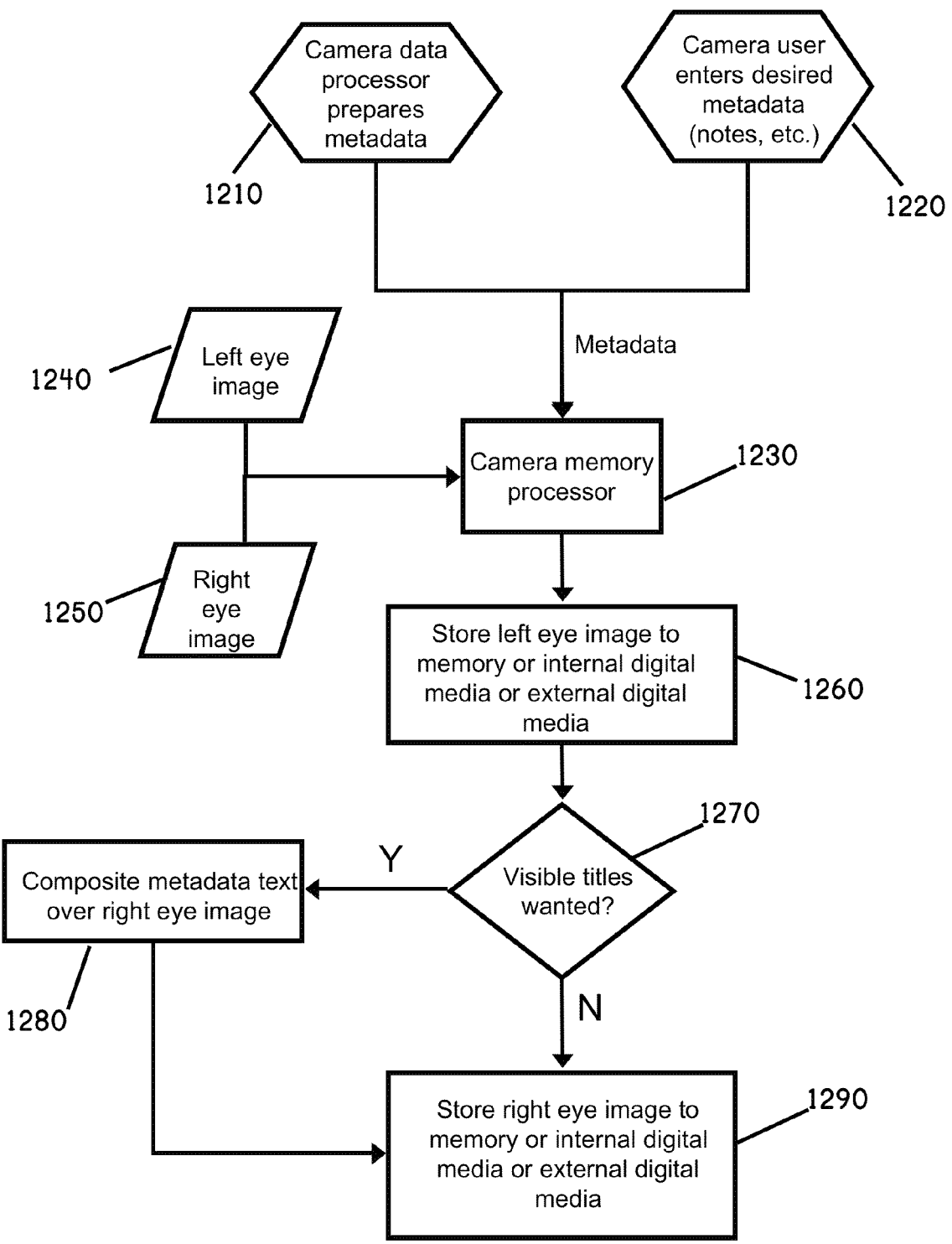
FIG. 12 is a flow chart of the logic to provide subtitling of stereoscopic imagery when the subtitling is performed during image capture.

FIG. 12 is a flowchart of a possible implementation of this subtitling method by software or hardware or a combination of both internal to the stereoscopic camera used to capture the imagery of interest. Referring specifically to FIG. 12, at step 1210, data which is produced internal to the camera such as time of day, f-stop, shutter speed and other camera status data is moved into the memory processor of the camera 1230 and formatted as metadata. At the same time, at step 1220, data which has been entered by the camera user and which is generally production related such as scene number, take number, scene or set notes and the like, is also moved into the memory processor of the camera 1230 and formatted as metadata. The memory processor of the camera 1230 then receives the two image data sets from the camera sensor system, one data set containing the left eye image 1240 and the second containing the right eye image 1250. At step 1260, the memory processor of the camera 1230 then stores the left image data set 1240 to the camera output memory or internal or external memory device.

The user will have made a decision prior to scene capture as to whether visible subtitles are wanted or not. This decision is checked at step 1270. If the decision was to not have visible subtitling, then the right eye image is stored to camera output memory or internal or external media 1290. If the decision was made to have visible subtitling, the metadata is taken from camera memory and an onboard processing system formats the metadata as visible subtitling and then composites the visible subtitling on top of the right eye image data in step 1280. This new right eye image data is then stored to camera output memory or internal or external media 1290.

Figure 13:
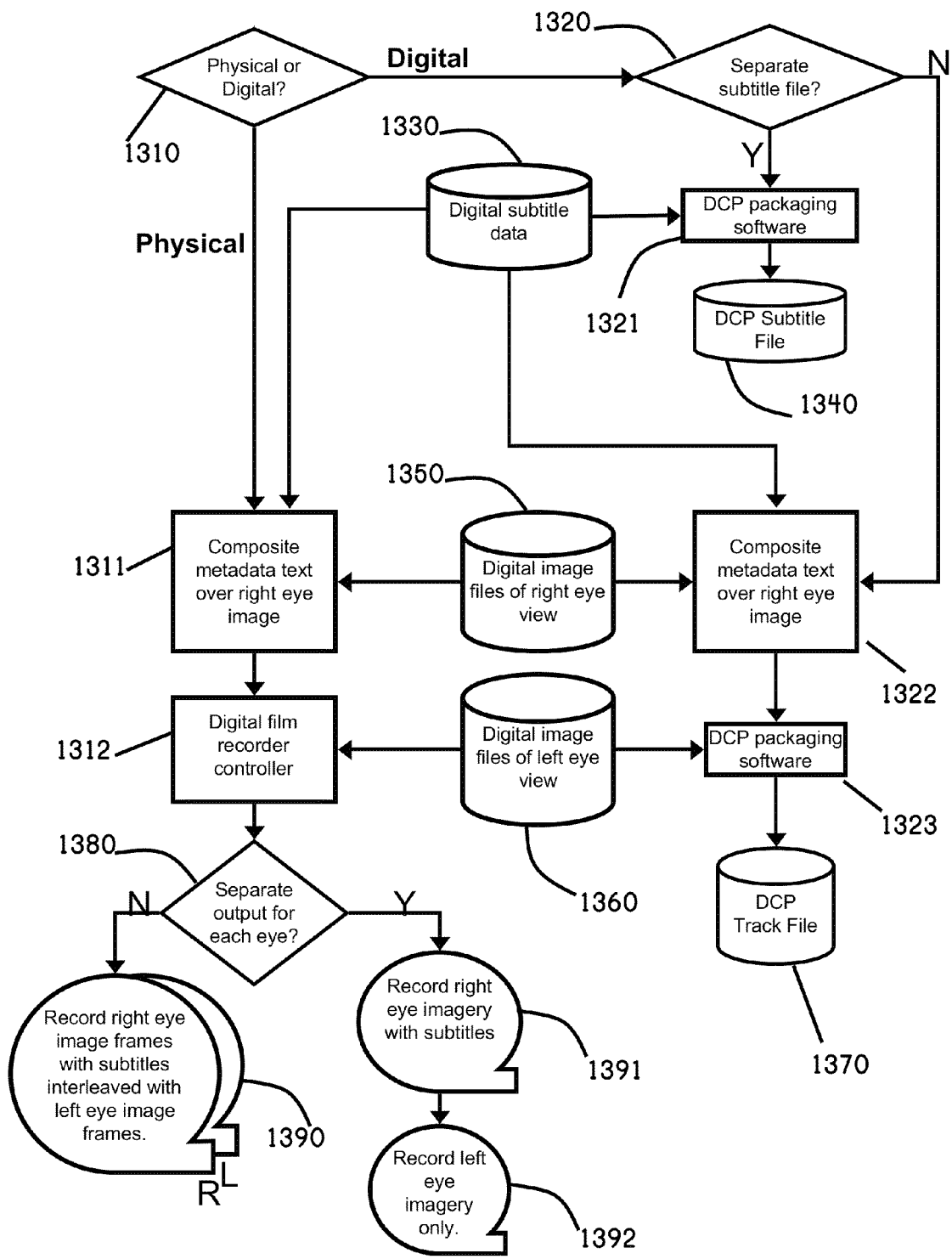
FIG. 13 is a flow chart of the logic for subtitling stereoscopic imagery when subtitling if performed following image capture.

FIG. 13 is a flowchart of a possible implementation of this subtitling method by software or hardware or a combination of both external to the stereoscopic camera used to capture the imagery of interest. Referring specifically to FIG. 13 a decision is made at step 1310 as to whether the output is to go to film or other physical printed media, or is to be delivered in a digital form. The image data for the right eye view 1350 and left eye view 1360 of each stereo pair, as well as the subtitling data 1330 for each stereo pair will have been previously formatted into appropriate digital files. For example, film negative may have been digitized using a film scanner or digitally captured data may have been copied. If the output is to go to film or other physical printed media, at step 1311 a processor takes the digital subtitle data 1330, format it as appropriate to create a visible subtitle and composite the visible subtitle over the digital file representing the right eye view image frame 1350 which properly corresponds to this subtitle. At step 1312 a digital output recorder controller, collects the newly composited right eye view image frame created in step 1311 and the left eye view image frame 1360 which properly creates the stereo pair with the right frame. It will have been previously decided whether the output will consist of separate output records for the left and right eye views, such as separate lengths of film for each eye view, or whether the output will consist of a single output record for the left and right eye views, such as a single length of film with interleaved left and right eye frames. The decision is tested at step 1380. If the decision was made to create separate left and right eye output records, then the entirety of composited right eye frames are output at step 1391 followed by the left eye frames at step 1392. It should be noted that steps 1391 and 1392 could be performed simultaneously so long as each of the steps is performed on a separate device. If the decision was made to create a single output record for both the left and right eye views, then the composited right eye frames and the left eye frames of each stereo pair are output in an interleaved fashion at step 1390.

If the decision at step 1310 was to create digital output, then at step 1320 a second decision is tested as to whether the subtitling is to be formatted and stored as a digital file separate from the corresponding stereo pairs of imagery. If the decision is made to store the subtitles separately, the digital subtitle data 1330 is passed to a processor that will package the subtitles into an appropriate format. FIG. 13 shows an example of this at step 1321 where the digital subtitles are formatted using a processor which creates a Digital Cinema Package per Digital Cinema Initiatives, LLC's "Digital Cinema System Specification". In particular, the processor formats the digital subtitles as a DCP Subtitle File 1340 per the above specification. Within this file, the right eye records contain the appropriate subtitles whereas the left eye records contain only a blank character. This is due to the Digital Cinema System Specification requirement that in the case of stereo data, the subtitle file must contain a record for both eye views of every stereo pair.

If the decision at step 1320 is to not create a separate subtitle file, then at step 1322, a processor will take the digital subtitle data 1330, format it as appropriate to create a visible subtitle and composite the visible subtitle over the digital file representing the right eye view image frame 1350 which properly corresponds to this subtitle. At step 1323, a processor will take the newly composited right eye image data, along with the left eye view image data 1360 and will package the stereo image pairs into an appropriate format. FIG. 13 shows an example of this at step 1323 where the digital stereo image pairs are formatted using a processor that creates a Digital Cinema Package per Digital Cinema Initiatives, LLC's "Digital Cinema System Specification". In particular, the processor formats the digital stereo image pairs as a DCP Track File 1370 per the above specification.

Figure 14:
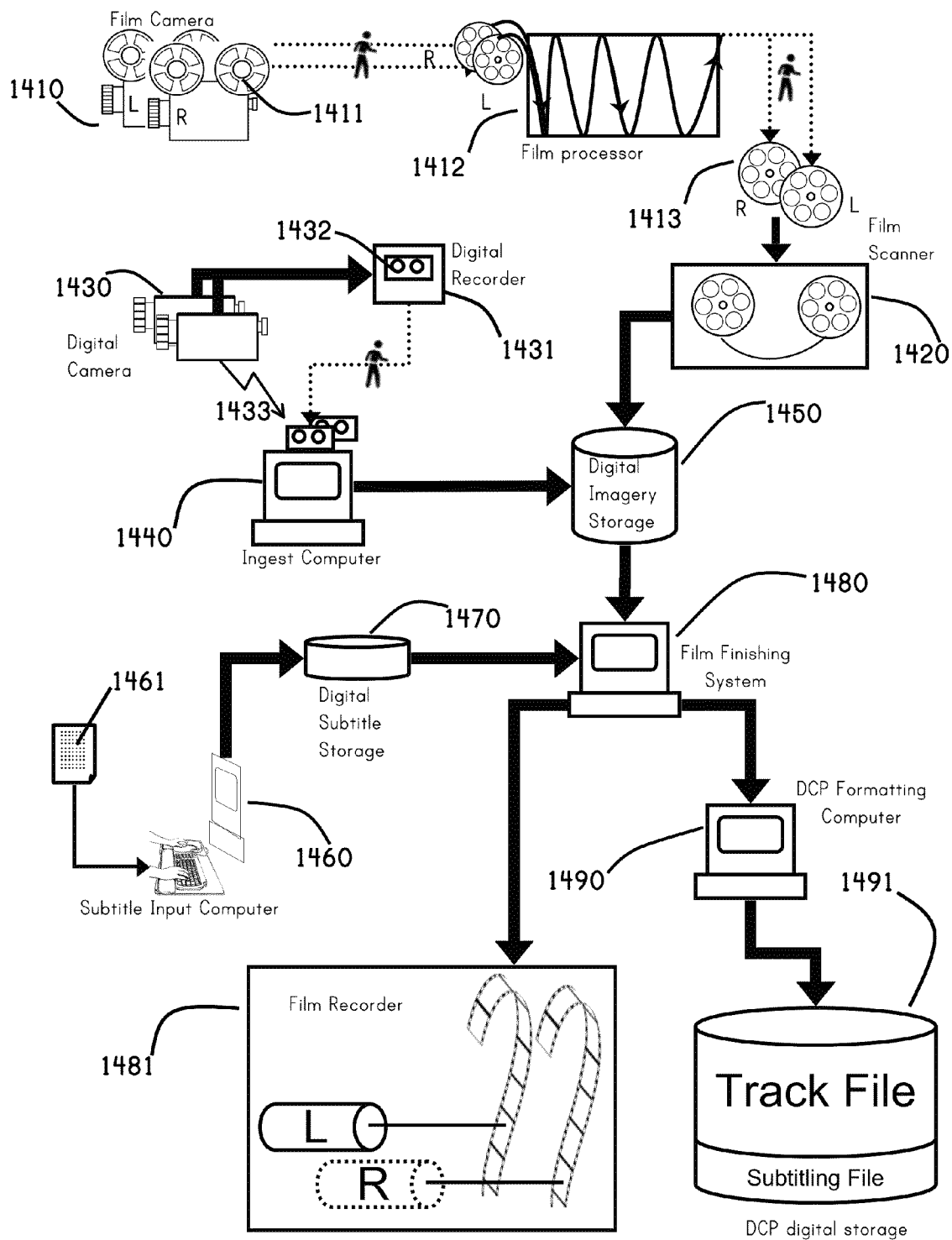
FIG. 14 is a block diagram of a method of subtitling stereographic imagery that is digitally mastered.

Referring to FIG. 14, a block diagram is shown of a method of subtitling stereographic motion imagery which is digitally mastered, utilizing the logic detailed in FIG. 13. The stereographic imagery may be initially acquired using one or more cameras 1410 which utilize lengths of film 1411 as a capture medium or the imagery may be initially acquired using one or more digital cameras 1430 which store the captured imagery onto a digital recording device 1431. The digital cameras 1430 may also transmit the captured digital imagery files directly to an ingest computer 1440 utilizing such network devices 1433 as would be appropriate to handle the digital data in compliance with the individual requirements of the imagery originator. The particular drawings of the film cameras 1410, film reels 1411, digital cameras 1430 and digital media 1432, in FIG. 14, anticipate that imagery captured onto film previously and then archived, as well as derivative imagery products from that original capture, such as interpositive film prints, internegative film, and release prints, may be utilized as input to this method in the identical fashion as those film reels 1411 and digital media 1432 drawn. If the stereographic imagery is stored on lengths of film, the film reels 1411 will be physically taken to a film processor 1412 where they will be photochemically processed. The processed reels of film 1413 will then be physically taken to a film scanner 1420 or equivalent device, which will, by various means, create digital files for each image frame on the film reels. These digital files will be stored on a digital imagery storage device 1450, which may consist of digital disk, tape or any other type of digital storage that may be utilized by a computer directly or over a network. If the stereographic imagery is stored on digital media 1432, then the digital media 1432, would be physically taken to an ingest computer 1440 for the ingestion of the digital imagery and storage on the digital imagery storage device 1450. The ingest computer 1440 is a computer with an interface and running computer programs that allows for the input and possible reformatting of the digital imagery from the digital media 1432 and which has an interface and computer programs that allow the computer to store the imagery data thus ingested from the digital media 1432 onto the digital imagery storage 1450.

At a given time, the subtitle information 1461 is created in digital form with the subtitle input computer 1460. The subtitle input computer is a computer with an interface and running computer programs that allows it to take the input textual or graphical information, properly format it for the digital system and store it on a digital subtitle storage device 1470 which may consist of digital disk, tape or any other type of digital storage which may be utilized by a computer directly or over a network. Although FIG. 14 draws the digital subtitle storage 1470 as having subtitle data input in conjunction with the digitization of the originally captured imagery, it is anticipated that the digital imagery storage 1450 may consist of removable, fixed or networked digital media which has been populated with a copy of stereographic imagery previously finished. For example, a digital copy of a film may be created and stored on magnetic tape in one country and transported to a second country where subtitles will be added.

The digital imagery stored on the digital imagery storage 1450 and the digital subtitle data stored on the digital subtitle storage 1470 may then be input to the film finishing computer 1480 for creation and output. The film finishing computer 1480 is one or more computers which collect the digital images from the digital imagery storage, arrange them in the desired order, and perform such image processing tasks as are desired by the content creator or are required for output formatting. The film finishing computer will also, based on the output choice made at step 1320 of FIG. 13, composite the subtitle data onto a single eye view of each stereo pair of images, in a location, size, color and graphic style of the content creators choosing.

If it is desired to have a new film element created from the subtitled stereo image pairs, the film finishing computer 1480 will transmit the image pairs to a film recorder 1481 for output as film elements, as detailed in FIG. 13. Although FIG. 14 draws a film recorder 1481 as the physical hard copy output device, it is anticipated that stereo image pairs may be printed upon any physical media utilizing both photographic and non-photographic means. For example, the stereo image pairs may be printed on paper utilizing inkjet, laser or offset printing techniques and devices.

If it is desired to create a Digital Cinema Package file from the stereographic imagery, the film finishing computer 1480 will transmit the image pairs to a DCP formatting computer 1490 for creation of the Digital Cinema Package. The DCP formatting computer 1490 may be one or many computers, which may or may not be part of the film finishing system 1480, with interfaces and computer programs which allow it to take the digital stereographic image data and reformat the data into a Digital Cinema Package consisting of a Track File and, possibly, a Subtitling File per Digital Cinema Initiatives, LLC's "Digital Cinema System Specification" and storing the DCP onto the DCP digital storage media 1491.

It is disclosed that the Digital Cinema Initiatives, LLC's "Digital Cinema System Specification" states that the Subtitling File must have one entry per image in the Track File. To satisfy this requirement, the entries in the Subtitle File which correspond to the eye view which does not contain the subtitling, per this disclosure, should have a blank for text data. When these entries are formatted and projected, the image thus projected will have nothing in it and will be seen as a clear frame.

It is anticipated that there will be other types of digital formats created, as the reference to the Digital Cinema Initiatives, LLC's "Digital Cinema System Specification" DCP does not preclude the creation of other digitally formatted packages for viewing.

A digital subtitle file which is to be projected from an auxiliary projector such as is discussed with respect to FIG. 8 or which is otherwise created as a separate digital file from the main stereographic imagery, may be created utilizing the method of FIG. 14. This separate subtitle file may be shown monoscopically. If a separate subtitling system is used which requires two separate eye view files for stereographic viewing, one eye view will be blank so that, if viewed, it will be seen as clear, while the second eye view will contain only the subtitle text.

Figure 15:
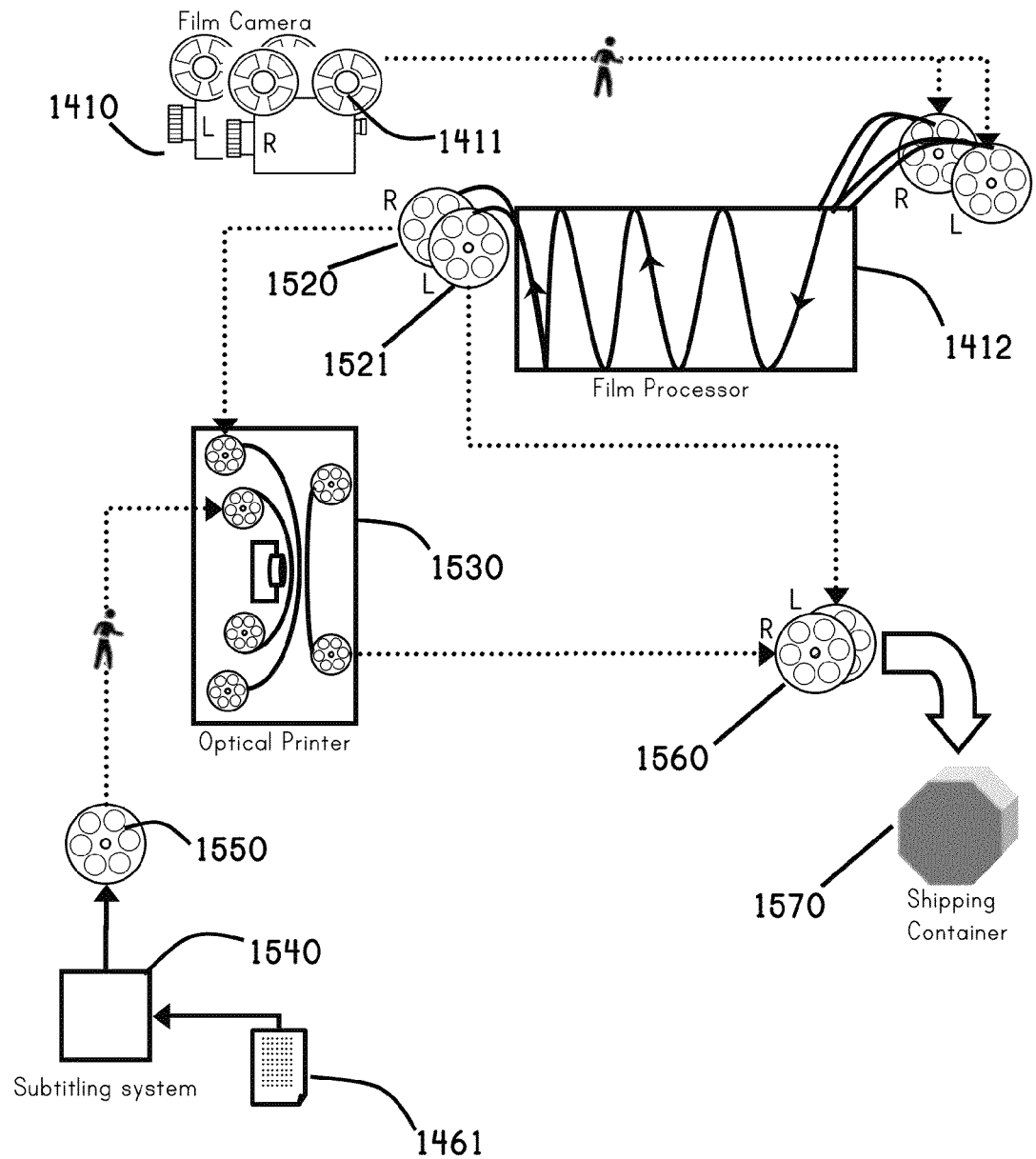
FIG. 15 is a block diagram of a method of subtitling stereographic imagery, which is not digitally mastered.

Referring to FIG. 15, a block diagram is shown of a method of subtitling stereographic imagery which is not digitally mastered; the imagery is captured, processed and finished photochemically. The stereographic imagery is acquired using one or more cameras 1410 which utilize lengths of film 1411 as a capture medium. As in the description of FIG. 14, the film reels 1411 may be physically taken to a film processor 1412 where they will be photochemically processed. This will produce processed reels 1520, and 1521, one each for the left and right eye. The left eye reel, 1521 is sent to the assembly and shipping area to await the right eye reel 1520. The right eye reel 1520 is mounted on an optical printer or equivalent device along with the subtitle film reel 1550 which was previously created by the subtitling system 1540 from the appropriate subtitle data 1461. The optical printer 1530 prints the subtitle image frames in synchronicity with the corresponding captured image frames onto a composite capture film reel 1560. This reel, following processing is then sent to the assembly and shipping area where it is put into shipping a shipping container 1570 along with its corresponding left eye reel 1521. Although subtitling of the single eye view being performed with an optical printer is shown, other types of printers may be utilized for this function. For example, the final film output may be imprinted with subtitle data utilizing a laser or other high energy radiation device or it may be printed onto the output medium utilizing standard ink printing techniques. Also, the imprinting of subtitle data may take place in the film processor utilizing photochemical, chemical, mechanical or electromagnetic means of imprint data onto film negative or positive. Further, as disclosed by FIG. 5 and FIG. 6, the stereo image pairs may be captured on a single length of film instead of two. Thus, the method of FIG. 15 may be utilized on a single reel of film. When the imprinting is done on the single eye view, the devices used for the imprinting must be properly set up to allow for the skipping of the non-subtitled eye view.

As in the discussion referring to FIG. 14, a subtitle film that is to be projected from an auxiliary projector, such as is discussed with respect to FIG. 8 or which is otherwise created as a separate film from the main stereographic imagery, may be created utilizing the method of FIG. 15. This separate subtitle film is shown monoscopically. Should a separate subtitling system be used which requires two separate eye view files for stereographic viewing, one eye view will be blank so that, if viewed, it will be seen as clear, while the second eye view will contain only the subtitle text.

Figure 16:
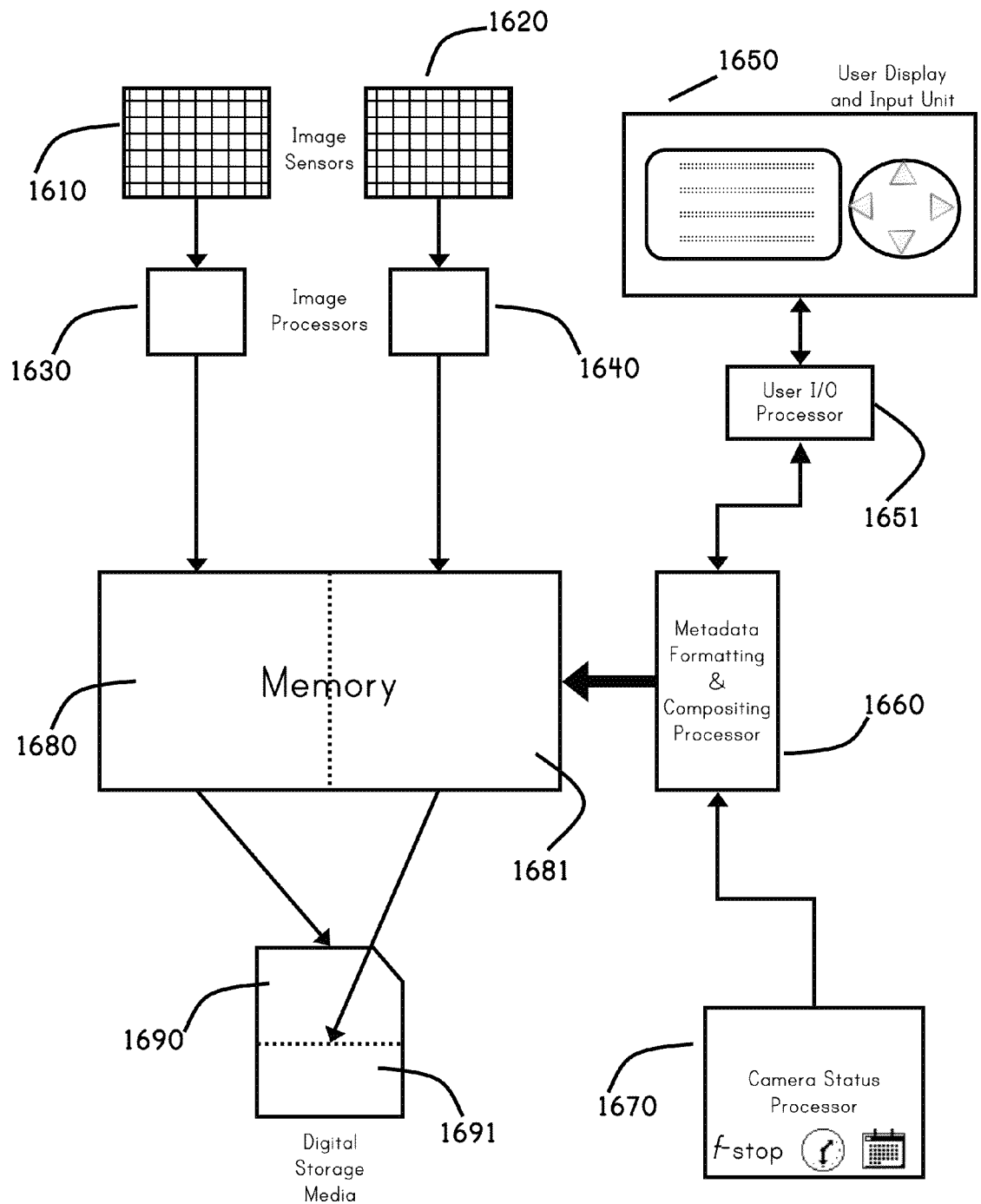
FIG. 16 is a block diagram of an apparatus to subtitle stereographic imagery during image capture.

Referring to FIG. 16, a block diagram is shown of an apparatus which imprints subtitle data upon one eye view of a stereo image pair during the capturing of that stereo pair. The apparatus shown is an integral component of the stereographic camera. Images are captured by image sensors 1610 and 1620, one for each of the left and right eye views. The digital sensor image data is then passed to image processors 1630 and 1640 which handle the corresponding eye views from the image sensors. These image processors consist of field programmable gate arrays (FPGAs), digital signal processors (DSPs), computer processors or combinations thereof which perform such processing as to create visually correct or pleasing imagery from the raw digital sensor data. The processed stereo image pair is then passed into camera memory 1680. The camera user may enter data about the imagery utilizing the user display and input unit 1650, which has some type of input device, such as a multifunction toggle switch, and a display for user feedback. The camera user may also select whether visible subtitling of the stereographic imagery is desired. The user entered data is passed to the user I/O processor 1651 which properly formats the input data stream for internal use as well as formatting internal status data and other data for display to the user via the user display and input unit 1650. The camera status processor 1670 obtains camera status data that includes but is not limited to time of day, date, shutter speed, f-stop, geodetic location and transfers the data to the metadata formatting and compositing processor 1660. The metadata formatting and compositing processor 1660 formats the camera status data from the camera status processor 1670 and the user entered data from the user I/O processor 1651 into an appropriate graphical format and composites this data onto a single eye view of the stereo image pair stored into the memory 1681. The data is composited onto the single eye view of the stereo image pair stored into the memory 1681 in response to the user selection of visible subtitling entered using the user display and input unit 1650. The metadata formatting and compositing processor 1660 also formats the camera status data into a visible format and passes it to the user I/O processor 1651 for display to the camera user via the user display and input unit 1650. The stereo image pair stored in memory, one eye view with no subtitling 1680 and one eye view with subtitles, if visible subtitles are selected by the user, 1681 are passed to the digital storage media and stored as two digital images 1690, 1691.

A single image sensor may be exposed and read in two halves corresponding to the left and right eye or may have two sequential exposures taken to correspond to left and right eye views. Further, a single image processor may operate on both the right and left eye image views in a pipeline or parallel fashion. These architectures are functionally equivalent to that drawn in FIG. 16.

Two single cameras may be utilized to capture stereographic imagery and substantially the same method and apparatus described herein may be used. Specifically, one camera should not imprint any visible subtitle data onto it's respective eye view, while the second camera should imprint visible subtitle data onto each image it captures.

The stereo image pair may be created as digital imagery entirely on a computing device utilizing computer programs. The method of FIG. 14 may be utilized to composite the subtitle data onto one of the images of the digital stereo pair corresponding to one eye view.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. An apparatus for imprinting subtitle data comprising:
 at least one sensor for acquiring stereoscopic image pairs
 at least one memory unit
 at least one image processor comprising circuits and software for
  reformatting the images pairs acquired from the sensors
  processing the image pairs to produce a desired visual appearance
  storing the images in the memory unit
  outputting the images from the memory unit to a digital storage medium
 an I/O subsystem comprising a display and input unit and an I/O processor, the I/O subsystem comprising circuits and software for
  displaying camera data and imagery to a camera user
  inputting user image data into the camera
  inputting user decisions to create visible subtitling of the stereoscopic images
 a metadata processor comprising circuits and software for
  reformatting at least one of user input and camera status data into text or graphics
  compositing the reformatted data onto a single eye view of the stereo image pair if visible subtitling is desired
  passing reformatted camera status data to the I/O processor for display to the camera user using the display and input unit a camera status processor for obtaining camera status from the camera system, wherein the camera status data includes at least one of time of day, date, shutter speed, f-stop, geodetic location.

2. The apparatus of claim 1 wherein the digital storage medium is at least one of disk, tape or solid state storage media contained within the camera disk, tape or solid state storage media which is external to the camera and an interface to the camera.

3. The apparatus of claim 1 wherein the interface comprises circuits and software for transmission of data between the camera and the digital storage medium.

* * * * *